United States Patent
Leroy et al.

(10) Patent No.: US 11,372,481 B2
(45) Date of Patent: Jun. 28, 2022

(54) HYDRAULICALLY AMPLIFIED DIELECTRIC ACTUATOR TAXELS

(71) Applicant: ECOLE POLYTECHNIQUE FEDERALE DE LAUSANNE (EPFL), Lausanne (CH)

(72) Inventors: Edouard Leroy, Lausanne (CH); Herbert Shea, Corcelles-Cormondrèche (CH); Min Gao, Neuchâtel (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 0 days.

(21) Appl. No.: 16/847,711

(22) Filed: Apr. 14, 2020

(65) Prior Publication Data

US 2021/0316446 A1    Oct. 14, 2021

(51) Int. Cl.
     *G06F 3/01*      (2006.01)
(52) U.S. Cl.
     CPC ................... *G06F 3/016* (2013.01)
(58) Field of Classification Search
     CPC ............... G06F 3/016; G06F 3/014
     See application file for complete search history.

(56) References Cited

U.S. PATENT DOCUMENTS

| | | | |
|---|---|---|---|
| 5,325,880 A | 7/1994 | Johnson | |
| 7,550,189 B1 | 6/2009 | McKnight | |
| 8,237,324 B2 | 8/2012 | Pei et al. | |
| 8,482,392 B2 | 7/2013 | Rousseau | |
| 8,551,599 B2 | 10/2013 | Hua | |
| 8,973,613 B2 | 3/2015 | Murphy | |
| 9,797,524 B2 | 10/2017 | Hui | |
| 9,898,903 B2 | 2/2018 | Khoshkava | |
| 10,240,688 B2 | 3/2019 | Besse et al. | |
| 2007/0166199 A1 | 7/2007 | Zhou | |
| 2007/0204926 A1 | 9/2007 | Beerling | |
| 2008/0173833 A1 | 7/2008 | Vyawahare | |
| 2009/0047197 A1 | 2/2009 | Browne | |

(Continued)

OTHER PUBLICATIONS

Acome, E., Mitchell, S. K., Morrissey, T. G., Emmett, M. B., Benjamin, C., King, M., ... & Keplinger, C. (2018). Hydraulically amplified self-healing electrostatic actuators with muscle-like performance. Science, 359(6371), 61-65.

(Continued)

*Primary Examiner* — Brian Wilson
(74) *Attorney, Agent, or Firm* — Andre Roland S.A.; Nikolaus Schibli

(57) ABSTRACT

A dielectric actuator including an enclosure forming a cavity having a dielectric fluid therein, the enclosure having a base, a flexible membrane and a reversibly-stretchable membrane, and a pair of electrodes, one electrode of the pair of electrodes arranged at the flexible membrane, the other electrode arranged at the base, the pair of electrodes arranged to generate an electric field to an area of the cavity that is filled with the dielectric fluid, wherein when the electric field is generated between the pair of electrodes, an electrostatic pressure in the dielectric fluid causes the flexible membrane to move towards the base, reducing an initial volume of the area of the cavity, increases a pressure of the dielectric fluid inside the cavity, and causes the reversibly-stretchable membrane to bump out to an expanded state.

13 Claims, 12 Drawing Sheets

(56) References Cited

U.S. PATENT DOCUMENTS

| | | | |
|---|---|---|---|
| 2009/0314368 A1 | 12/2009 | McAvoy | |
| 2010/0093559 A1 | 4/2010 | Fan | |
| 2010/0162109 A1 | 6/2010 | Chatterjee et al. | |
| 2010/0229610 A1 | 9/2010 | Garrigan | |
| 2010/0234779 A1 | 9/2010 | Asvadi et al. | |
| 2010/0295820 A1 | 11/2010 | Kikin-Gil | |
| 2012/0105333 A1 | 5/2012 | Maschmeyer | |
| 2012/0128549 A1 | 5/2012 | Zhou | |
| 2013/0269176 A1 | 10/2013 | Ishida | |
| 2014/0079571 A1 | 3/2014 | Hui | |
| 2014/0157769 A1 | 6/2014 | Daly | |
| 2015/0240958 A1 | 8/2015 | Mosadegh | |
| 2015/0247580 A1 | 9/2015 | Au | |
| 2017/0194553 A1 | 7/2017 | Ifju | |
| 2018/0003319 A1* | 1/2018 | Besse | F16K 99/0038 |
| 2018/0066636 A1 | 3/2018 | Khoshkava | |
| 2021/0003149 A1* | 1/2021 | Keplinger | F15B 5/006 |
| 2021/0284525 A1* | 9/2021 | Liu | H01L 41/09 |

OTHER PUBLICATIONS

Aran, K., Sasso, L. A., Kamdar, N., & Zahn, J. D. (2010). Irreversible, direct bonding of nanoporous polymer membranes to PDMS or glass microdevices. Lab on a Chip, 10(5), 548-552.

Besse, N., Rosset, S., Zarate, J. J., & Shea, H. (2017). Flexible active skin: large reconfigurable arrays of individually addressed shape memory polymer actuators. Advanced Materials Technologies, 2(10), 1700102.

Biswas, S., & Visell, Y. (2019). Emerging material technologies for haptics. Advanced Materials Technologies, 4(4), 1900042.

Boys, H., Frediani, G., Ghilardi, M., Poslad, S., Busfield, J. C., & Carpi, F. (2018, April). Soft wearable non-vibratory tactile displays. In 2018 IEEE International Conference on Soft Robotics (RoboSoft) (pp. 270-275). IEEE.

Gloves, Model: "HaptX | Haptic gloves for VR training, simulation, and design," HaptX, 2019 https://haptx.com/.

Haga, Y., Makishi, W., Iwami, K., Totsu, K., Nakamura, K., & Esashi, M. (2005). Dynamic Braille display using SMA coil actuator and magnetic latch. Sensors and Actuators A: Physical, 119(2), 316-322.

Jansen, Y., Karrer, T., & Borchers, J. (Nov. 2010). MudPad: tactile feedback and haptic texture overlay for touch surfaces. In ACM International Conference on Interactive Tabletops and Surfaces (pp. 11-14).

Kellaris, N., Venkata, V. G., Rothemund, P., & Keplinger, C. (2019). An analytical model for the design of Peano-HASEL actuators with drastically improved performance. Extreme Mechanics Letters, 29, 100449.

Kellaris, N., Venkata, V. G. Smith, G. M., Mitchell, S. K., & Keplinger, C. (2018). Peano-HASEL actuators: Muscle-mimetic, electrohydraulic transducers that linearly contract on activation. Science Robotics, 3(14).

King, H. H., Donlin, R., & Hannaford, B. (Mar. 2010). Perceptual thresholds for single vs. multi-finger haptic interaction. In 2010 IEEE Haptics Symposium (pp. 95-99). IEEE.

Koo, I. M., Jung, K., Koo, J. C., Nam, J. D., Lee, Y. K., & Choi, H. R. (2008). Development of soft-actuator-based wearable tactile display. IEEE Transactions on Robotics, 24(3), 549-558.

Lee, H. S., Phung, H., Lee, D. H., Kim, U. K., Nguyen, C. T., Moon, H., . . . & Choi, H. R. (2014). Design analysis and fabrication of arrayed tactile display based on dielectric elastomer actuator. Sensors and Actuators A: Physical, 205, 191-198.

Merck / Sigma-Aldrich products: (3-Aminopropyl)trimethoxysilane 97%, 2019. https://www.sigmaaldrich.com/catalog/product/aldrich/281778?lang=fr&region=FR.

Mitchell, S. K., Wang, X., Acome, E., Martin, T., Ly, K., Kellaris, N., . . . & Keplinger, C. (2019). An Easy-to-Implement Toolkit to Create Versatile and High-Performance HASEL Actuators for Untethered Soft Robots. Advanced Science, 6(14), 1900178.

Mun, S., Yun, S., Nam, S., Park, S. K., Park, S., Park, B. J., . . . & Kyung, K. U. (2018). Electro-active polymer based soft tactile interface for wearable devices. IEEE transactions on haptics, 11(1), 15-21.

Piezotech-Arkema powders, 2019, Type: "Electroactive polymers Piezotech®", https://www.piezotech.eu/en/Products/Powders.

Poulin, A., Maffli, L., Rosset, S., & Shea, H. (Apr. 2015). Interfacing dielectric elastomer actuators with liquids. In Electroactive Polymer Actuators and Devices (EAPAD) 2015 (vol. 9430, p. 943011). International Society for Optics and Photonics.

Qiu, Y., Lu, Z., & Pei, Q. (2018). Refreshable tactile display based on a bistable electroactive polymer and a stretchable serpentine Joule heating electrode. ACS applied materials & interfaces, 10(29), 24807-24815.

Russomanno, A., Xu, Z., O'Modhrain, S., & Gillespie, B. (Jun. 2017). A pneu shape display: Physical buttons with programmable touch response. In 2017 IEEE World Haptics Conference (WHC) (pp. 641-646). IEEE.

Sunkara, V., Park, D. K., & Cho, Y. K. (2012). Versatile method for bonding hard and soft materials. Rsc Advances, 2(24), 9066-9070.

Tang, L., & Lee, N. Y. (2010). A facile route for irreversible bonding of plastic-PDMS hybrid microdevices at room temperature. Lab on a Chip, 10(10), 1274-1280.

Vishniakou, S., Lewis, B. W., Niu, X., Kargar, A., Sun, K., Kalajian, M., . . . & Sun, Z. (2013). Tactile feedback display with spatial and temporal resolutions. Scientific reports, 3(1), 1-7.

Wrist Watch, Model: "Dot Watch—In touch with the world. From your wrist." (2019) https://www.dotincorp.com.

Wu, X., Kim, S. H., Zhu, H., Ji, C. H., & Allen, M. G. (2012). A refreshable braille cell based on pneumatic microbubble actuators. Journal of Microelectromechanical Systems, 21(4), 908-916.

Yu, Z., Niu, X., Brochu, P., Yuan, W., Li, H., Chen, B., & Pei, Q. (Apr. 2010). Bistable electroactive polymers (BSEP): large-strain actuation of rigid polymers. In Electroactive Polymer Actuators and Devices (EAPAD) 2010 (vol. 7642, p. 76420C). International Society for Optics and Photonics.

Zárate, J. J., & Shea, H. (2016). Using pot-magnets to enable stable and scalable electromagnetic tactile displays. IEEE transactions on haptics, 10(1), 106-112.

Zhao, H., Hussain, A. M., Duduta, M., Vogt, D. M., Wood, R. J., & Clarke, D. R. (2018). Compact dielectric elastomer linear actuators. Advanced Functional Materials, 28(42), 1804328.

\* cited by examiner

BACKGROUND

BACKGROUND

|  | dielectric elastomer actuator (DEA) | hydraulically amplified self-healing electrostatic (HASEL) actuator | HAXEL actuator |
|---|---|---|---|
| Features | • Potentially fully stretchable<br>• High strain<br>• Mechanical characteristic close to the skin<br>• Array compatible<br>• mm-scale actuators | • Large variety of dielectric material<br>• No stretchable electrodes<br>• Built-in amplification<br>• High reliability<br>• Deformation in all directions | • Large variety of dielectric material<br>• No stretchable electrodes<br>• Built-in amplification<br>• High reliability<br>• mm-scale actuator<br>• Array compatible |
| Typical characteristics | • Size: 1.5-15mm<br>• Mass: 2mg-6g<br>• Force density: 0.01-0.6N/cm²<br>• Specific energy: 0.1- 0.8J/kg<br>• Specific power: 22.5W/kg | • Size: 40-50mm<br>• Mass: 5-26g<br>• Force density: 2.4-4N/cm²<br>• Specific energy: 0.2J/kg (Donut), 2.5J/kg (Peano)<br>• Specific power: 80W/kg (mean), 160W/kg (peak) | • Size: 6mm<br>• Mass: 30-90mg<br>• Force density: 0.8N/cm²<br>• Specific energy: 0.17J/kg (full actuator)-0.51J/kg (active part only)<br>• Specific power: 34W/kg (full actuator), 103W/kg (active part only) |

FIG. 1E

Design with a cavity fully made of dielectric material

External force (screws...) Design with external force ensuring cavity sealing

Design with dielectric on only one side

Zig-zag edges

| Name | Front/back | Clockwise | No excitation | Up/down | Left/right |
|---|---|---|---|---|---|
| Motion | ↕ | ↻ | | ↔ | ↕ |
| Actuation sequence | | | | | |

FIG. 8

HYDRAULICALLY AMPLIFIED DIELECTRIC ACTUATOR TAXELS

FIELD OF THE INVENTION

The present invention is directed to the field of mechanical actuators and arrays thereof, more specifically actuators of the field of haptics and haptic feedback, tactile displays, and actuators for touch feedback systems, for example for virtual and augmented reality applications.

BACKGROUND

Virtual and augmented reality (VR and AR) aims to provide an immersive environment where the user can interact naturally with a virtual objects for training, gaming, remote surgery or teleoperation. While humans are visually dominated, our other senses are essential for true immersion, with the sense of touch being particularly underexploited. The underusing of the sense of touch for Virtual Reality system can be explained because we lack wearable, compliant and mm-scale transducers to generate localized mechanical stimulus over large areas such as a hand or an arm. For example, wearable devices stimulating the sense of touch lag far behind the advanced development of VR headsets. The engineering challenges for developing advanced haptic interface are many, because the tactile sensors of the human body have not only high spatial resolution (as low as 1 mm) and high bandwidth, for example from DC up to 800 Hz, but also can sense a very large dynamic range of displacements, able to feel features from few micrometers up to the millimeter range, see reference [1], and sense both normal and shear forces. To provide a convincing sense of touch for a handling task requires hundreds to individual actuators to stimulating the skin on fingers and palm, yet these thin actuators must all be comfortably integrated into a glove.

The use of shear force in portable applications has been very limited, as making arrays of pins to provide normal force, such as Braille display, is already very challenging, even in a rigid configuration. Yet a great deal of how we make use of our sense of touch is based on shear force: identifying a surface merely by brushing one's finger over it, or preventing a glass of water from slipping out of one's grip exploits human's well developed shear force sensors. Braille displays, while not wearable and not flexible, are one of the most mature application of haptic interfaces. They illustrate the challenges of integrating dense arrays of actuators on a 2.5 mm pitch that must meet simultaneously force, displacement and speed requirements. The main commercial products are based on piezoelectric bender actuators that are used as levers to push pins, such as the HyperBraille™ from Medtech. Recent developments have shown portable displays using electromagnetic technologies but with reduced force, see reference [2]. Research prototypes based on electromagnetic technologies, see reference [3], shape-memory alloys, see reference [4], or active fluids, see reference [5], have also been proposed.

To make tactile display wearable, polymer-based materials have been used. For example, elastomers can easily integrated in a wearables such as a glove, and their mechanical properties are close to human's skin providing a more natural feel and interaction. Pneumatic devices such as the commercial HaptX glove, see reference [6], or examples in literature, see references [7,8] are based on an inflatable actuator membrane, limited to normal forces. The used external compressor and controller exclude untethered operation but enable generate high forces, for example 90 mN to 500 mN on a small pitch of 1.5 mm, see references [8], [9]. Controlling many actuators requires complex tubing and large number of pneumatic valves. To reduce complexity, devices have been developed based on shape memory polymers, see references [9,10] requiring a single pressure source while each taxel is addressed electrically by local heating. The control system is therefore simplified but the response time around 1s not suitable for VR applications, see references [9,10].

For wearables, direct electrical actuation rather than remote hydraulic actuation is preferable. Dielectric elastomer actuators (DEA) use an electric field to deform elastomers. They can be processed into arrays of addressable taxels, see reference [11] and soft wearable interfaces, see reference [12]. Although simple mm-scale devices generate forces too low for robust haptics (<50 mN), it is possible to increase force output using hydraulic amplification (120 mN, see reference [11]), rolled structures (450 mN, see reference [13]) or hybrid systems using a heat activated shape memory polymer as dielectric (600 mN latched force, see reference [14]).

Hydraulically amplified self-healing electrostatic actuator (HASEL) devices are a type of dielectric actuator using liquid dielectric instead of elastomers, leading to built-in hydraulic amplification, see reference [15]. The HASEL concept has been adapted to a structure (peano-HASEL) made with inextensible shells that do not require stretchable electrodes and allows using a wider range of dielectric material, potentially with high permittivity such as PVDF, see references [16] and [17]. Their concept is based on a zipping electrode that linearly contracts a fluidic cavity as a function of voltage. Peano-HASEL devices have strains of 25%, specific energy (up to 1.12 J/kg) and power (up to 160 W/kg).

Despite all these advancements in the field of actuators that can be used for touch feedback, strongly improved solutions in the field of actuators is still desired, to provide for a more compact design, high force density, and fast response times.

SUMMARY

According to one aspect of the present invention, a dielectric actuator is provided. The dielectric actuator preferably includes an enclosure forming a cavity having a dielectric fluid therein, the enclosure having a base, a flexible membrane and a reversibly-stretchable membrane, and a pair of electrodes, one electrode of the pair of electrodes arranged at the flexible membrane, the other electrode arranged at the base, the pair of electrodes arranged to generate an electric field to an area of the cavity that is filled with the dielectric fluid, wherein when the electric field is generated between the pair of electrodes, an electrostatic pressure in the dielectric fluid causes the flexible membrane to move towards the base, reducing an initial volume of the area of the cavity, increases a pressure of the dielectric fluid inside the cavity, and causes the reversibly-stretchable membrane to bump out to an expanded state.

According to another aspect of the present invention, another dielectric actuator is provided. The dielectric actuator preferably further includes a second pair of electrodes, one electrode of the second pair of electrodes arranged at a different location of the flexible membrane as compared to the one electrode of the first pair, the other electrode arranged at the base, the second pair of electrodes arranged to generate an second electric field to a second area of the cavity that is filled with the dielectric fluid.

According to still another aspect of the present invention, a matrix of a plurality of dielectric actuators are provided. Preferably, the matrix of a plurality of dielectric actuators is mounted to a base that is formed by a flexible substrate, more preferably a flexible printed circuit board.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE SEVERAL VIEWS OF THE DRAWINGS

The accompanying drawings, which are incorporated herein and constitute part of this specification, illustrate the presently preferred embodiments of the invention, and together with the general description given above and the detailed description given below, serve to explain features of the invention.

FIGS. 1A to 1E provide exemplary simplified cross-sectional views of two existing dielectric actuator technologies and a cross-sectional simplified view of the herein presented hydraulically amplified dielectric actuator taxels (HAXEL), with FIG. 1A showing an exemplary dielectric elastomer actuator (DEA), FIG. 1B showing a cross-sectional view of a hydraulically amplified self-healing electrostatic actuator (HASEL), for example the Peano-HASEL, FIG. 1C shows an exemplary, simplified, cross-sectional view of the HAXEL actuator 100 in a initial, non-expanded state, FIG. 1D shows an exemplary, simplified, cross-sectional view of the HAXEL actuator 100 in a actuated, expanded state, according to an aspect of the present invention, and FIG. 1E shows a table with exemplary values comparing characteristics of the DEA, HASEL, and the herewith presented HAXEL actuators;

FIG. 2B shows a perspective view of an array of exemplary square-shaped HAXEL actuators 100 including 64 actuators, in a 6×6 square taxel array, with a single actuated taxel, the array having a pitch is 8 mm, FIG. 2C shows a cross-section view of the layer structure of a single, exemplary HAXEL actuator, where upon actuation, fluid 70 between the bottom and top electrodes 32, 34 is pushed to deform the centrally-arranged reversibly-stretchable layer 65, FIG. 2D shows an exemplary top semi-transparent view of two adjacently-arranged HAXEL actuators, each actuator having a different shape of the cavity volume, showing a circular cavity and a square cavity, FIG. 2E showing simplified and exemplary fabrication process or method steps for manufacturing an exemplary HAXEL actuator 100, showing a step of laser-cutting the metallized Mylar membrane and the etching of the electrodes, a step of depositing the dielectric material onto the electrode in a solvated form using an applicator, a step of using a silanization and O2 plasma process to bond the top 50 μm stretchable polydimethylsiloxane (PDMS) membrane and a 20 μm PDMS membrane that is used as a seal for the sealing layer 40; and FIG. 2F showing a cross-sectional view exemplarily showing the reinforcement rings at the reversibly-stretchable layer 65;

FIG. 4B shows top and cross-sectional views of an asymmetric activation of reversibly-stretchable layer 65 by an actuation at two compression zones CZ1, CZ3 as an example of a partial actuation by two electrode pairs 30.1 and 30.3, and FIG. 4C shows an vertical extension profile of reversibly-stretchable layer 65 and a height of extension as a function of a location on central axis CA;

FIG. 8 shows a table that represents exemplary different states and patterns of the HAXEL actuator 200 having four (4) exemplary compression zones CZ, and motional patterns that can be generated by HAXEL actuator 200.

Herein, identical reference characters are used, where possible, to designate identical elements that are common to the figures. Also, the images in the drawings are simplified for illustration purposes and may not be depicted to scale.

DETAILED DESCRIPTION OF THE SEVERAL EMBODIMENTS

Figure 1A:
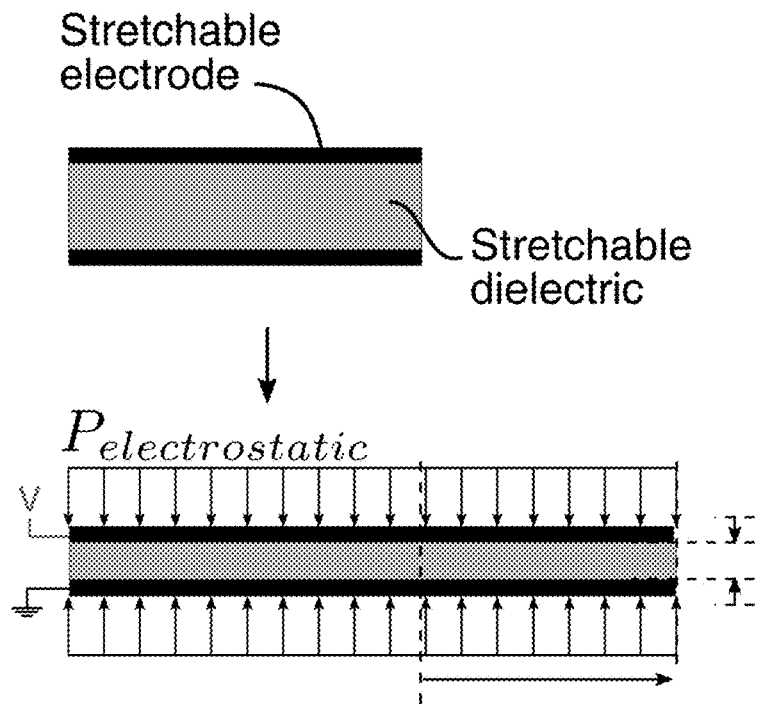
Figure 1B:
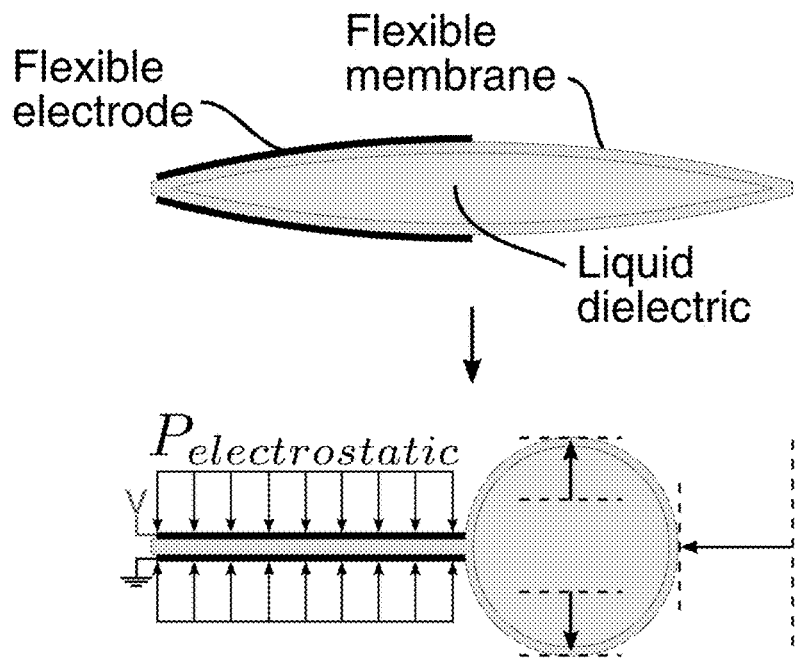
Figure 1C:
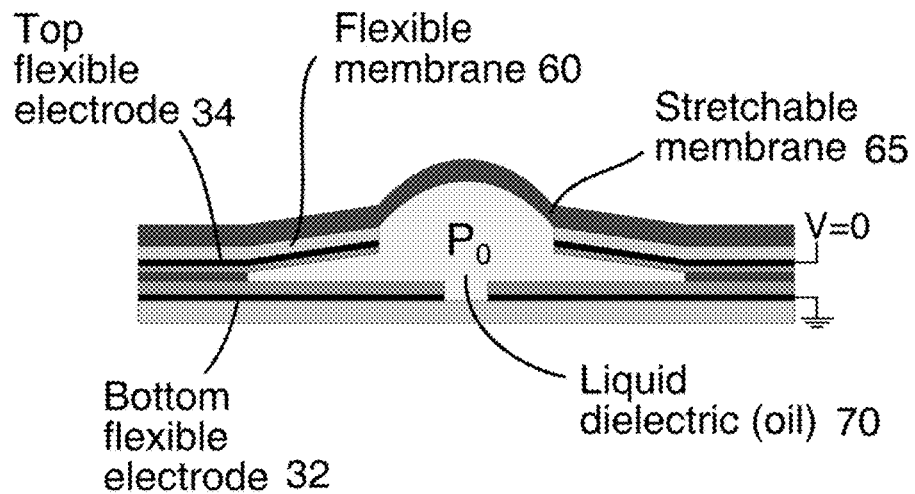
Figure 1D:
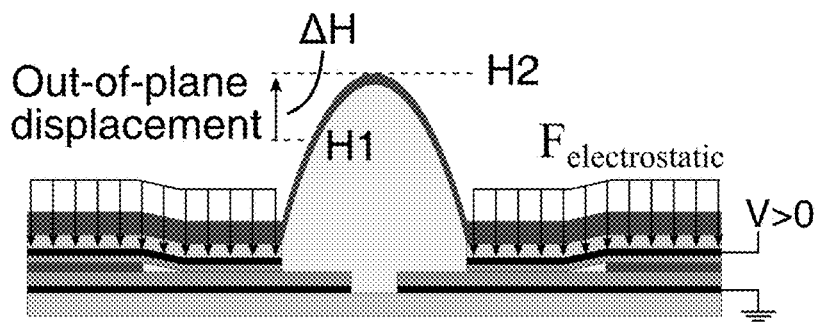
Figure 2A:
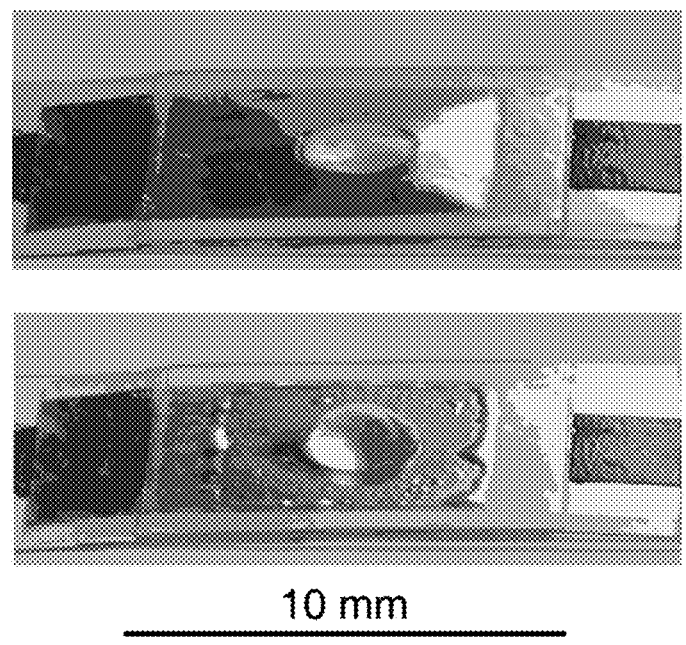
FIGS. 2A to 2F show different aspects of the herein presented HAXEL actuators design and fabrication, with FIG. 2A showing a perspective top view of two (2) single HAXEL actuators 100 with a 6 mm diameter and 2.5 mm inner diameter, in its initial non-expanded state in the upper section and actuated, expanded state in the lower section.
Figure 2B:
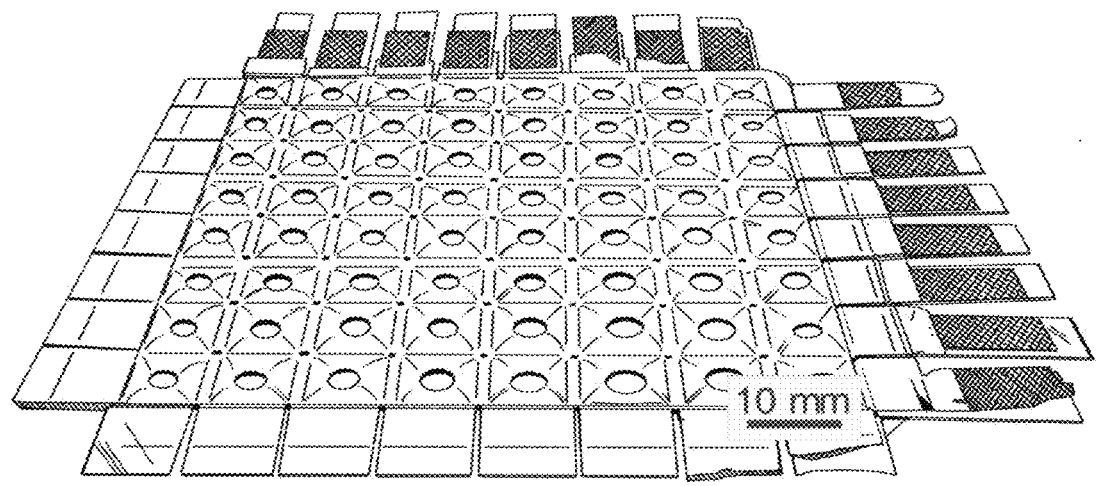
Figure 2D:
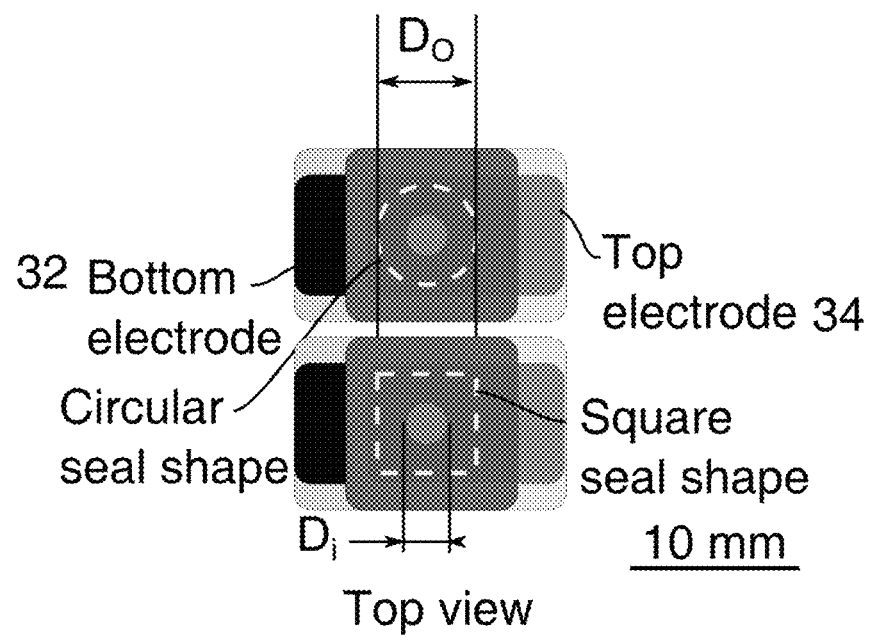
Figure 2C:
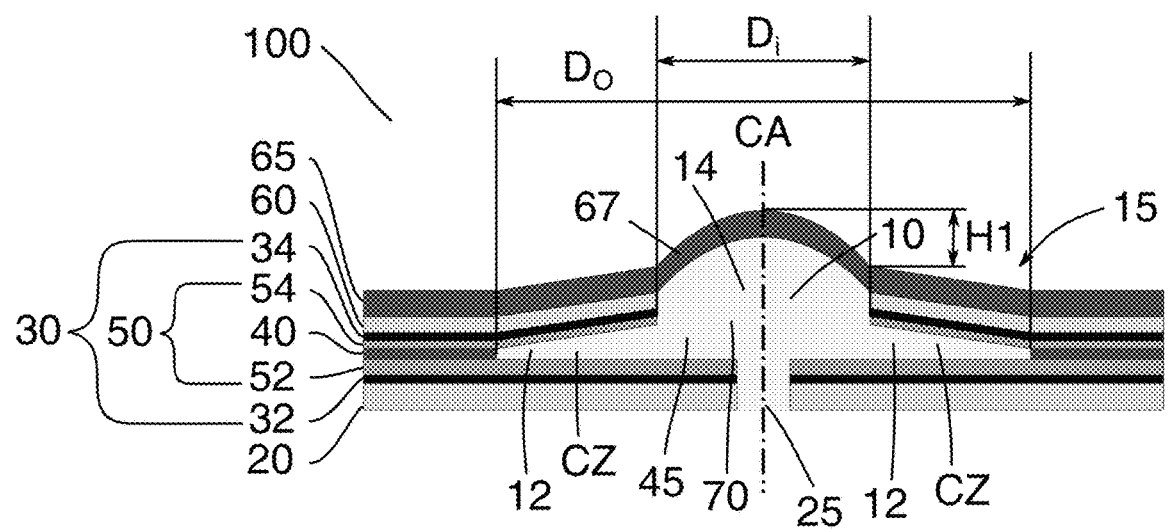

According to one aspect of the present invention, a new type of hydraulically amplified actuator is presented, specifically designed for cutaneous haptic feedback called HAXEL, shown in FIGS. 1C, 1D, and 2C. In FIG. 1C, the HAXEL actuator 100 is shown in a relaxed, initial, non-expanded state, and in FIG. 1D, HAXEL actuator 100 in an engaged, expanded state. As shown in these figures with a cross-sectional views, a single HAXEL actuator 100 includes a fluid-filled cavity 10 enclosed by a shell, casing or enclosure 15 that is made of several layers, including a substrate or base 20, a bottom electrode 32 that forms an electrode of a pair of electrodes 30, a bottom dielectric layer 52 of a pair of dielectric layers 50 that is facing the cavity 10, a closable filling port 25 that can traverse the rigid substrate 20, bottom electrode 32, and the bottom dielectric layer 52, and a sealing layer 40 that defines a central opening 45 that forms a part of the cavity 10. Sealing layer 40 is used as a spacer between the dielectric layer pair 50. Substrate or base 20 can be very rigid, for example a rigid printed circuit board, but can also be flexible, for example a flexible printed circuit board. Cavity 10 is filled by a relatively incompressible or slightly compressible but viscous dielectric fluid 70.

Generally, it is preferable that dielectric fluid 70 that has dielectric properties, has a low viscosity for improved response time and frequency response, and is incompressible. Closable filling port 25 can be closed by a plug, sealant, adhesive, glue, bolt, or other suitable device (not shown). In the variant shown, the central opening 45 defines the widest dimension of the cavity 10, and substrate 20, bottom electrode 32, bottom dielectric layer 52, and sealing layer 40 form the elements of the HAXEL actuator 100 can be non-movable an non-stretchable. Next, on top of sealing layer 40, there is a top dielectric layer 54 that is the other dielectric layer of the pair of dielectric layers 50, top dielectric layer 54 facing the cavity 10, a top electrode 34 forming the other electrode of the pair of electrodes 30, a top flexible layer 60 that is placed to cover the top electrode 34. Top dielectric layer 54, top electrode 34, and top flexible layer 60 each include a central opening 47 that is less wide than central opening 45. Next, covering both the top flexible layer 60 and the central opening 47 of cavity 10, a reversibly-stretchable layer 65 is arranged. In the variant shown, top dielectric layer 54, top electrode 34, top flexible layer 60, and reversibly-stretchable layer 65 form the movable or displaceable elements of the HAXEL actuator 100. As an example, reversibly-stretchable layer 65 can be made of silicon material.

In a relaxed, non-expanded shape as shown in FIG. 1C, a central portion 67 of the reversibly-stretchable layer 65 forms a dome-shape or spherical shape, the dome or sphere extending from the edges of central opening 47 by a height H1. It is possible that height H1 is negative or zero. Peripheral area 12 of cavity 10 that are formed between the pair of dielectric layers 50, and defined by the extension of the central opening 45, forming a ring or circular shape in the relaxed state, is designated as the peripheral area 12 of cavity 10. In this respect, peripheral area 12 of cavity 10 forms a reversibly collapsible and expandable volume of the cavity 10, for moving dielectric fluid 70 in and out, referred to as a compression zone CZ.

To switch from the relaxed, non-expanded state to the engaged, expanded or activated state, by application of an actuation voltage to the pair of electrodes 30 by a voltage source, and by virtue of an electrostatic pressure and attraction to the pair of electrodes 30, the pair of dielectric layers 50 and the pair of electrodes 30 are urged towards each other, as shown in FIG. 1D. As an example, peripheral portions around central area 14 of cavity 10 of the top reversibly-stretchable layer 65, top flexible layer 60, top electrode 34, and top dielectric layer 54 move towards the compressions zone CZ, being the peripheral area 12 of cavity 10, while the substrate 20, bottom electrode 32, and bottom dielectric layer 52 can remain rigid or are somewhat flexible but still providing a non-flexible base relative to moveable layers, as shown in FIG. 1D. The opposing surfaces of the pair of dielectric layers 52, 54 thereby can contact each other, and due to their electric insulating properties, they prevent a short circuit between electrode pairs 30. This results in a collapse or compression of the ring-shaped or disk-shaped peripheral area 12 of cavity 10, circular-symmetrical around its central axis CA, also referred to as the compression zone CZ, as shown in the bottom representation of FIG. 1C. In turn, this also results in a pressing or urging of the dielectric fluid 70 towards central area 14 of cavity 10, central area 14 of cavity 10 facing the reversibly-stretchable layer 65. In other words, a pressure inside cavity 10 of the dielectric fluid 70 is increased. Next, the accumulation of dielectric fluid 70 at the central area 14 and increase in pressure results in a bumping up, popping out, or zipping of central portion 67 of reversibly-stretchable layer 65 and a displacement of its apex to a height H2 from the initial height H1, H2 being higher than height H1. In other words, central portion 67 of reversibly-stretchable layer 65 is expanded or stretched from a first state to a second state, the second state having an increased tensile forces inside the membrane as compared to the first state. In this respect, fluid 70 acts inside cavity 10 as a hydraulic medium that allows to cause action on reversibly-stretchable layer 65.

Speaking relative to the substrate or base 20, in the transition from the relaxed to the engaged state, top electrode 34 and top dielectric layer 54 that are above compression zone CZ will move downwards or towards base 20, such that dielectric layers 52 and 54 can contact each other, and in turn, central portion 67 of reversible-stretchable membrane 65 will stretch and expand such that an apex or summit of central portion 67 will move upwards or away relative to base 20, moving substantially perpendicularly to a planar extension of base 20 along a central axis CA. Also, as adjacent portions of reversible-stretchable membrane 65 are in movable contact with top electrode 34 via flexible membrane 60, these adjacent portions move downwards or towards base 20 with top electrode 34. A distance of motion of the apex of central portion 67 of reversible-stretchable membrane 65 relative to base 20 will be bigger than a largest distance of motion of top electrode layer 34 toward base 20. During this motion, while base 20 can be made from a somewhat flexible material itself, relatively speaking, base 20 remains substantially rigid relative to the flexibility provided by the moving elements, including reversible-stretchable membrane 65, flexible layer 60, top dielectric layer 54, and top electrode 34.

When the actuation voltage is removed from the pair of electrodes 30, the elastic and spring effect of the flexible top electrode 34 and top flexible layer 60 will move these layers around central area 14 upwards to an initial state again, where a ring or circularly-shaped peripheral area 12 of cavity 10 is reestablished and filled up with the dielectric fluid 70, thereby increasing the overall volume of cavity 10 again, resulting in a drop of pressure of fluid 70. This in turn leads to a retraction or pulling-in of the reversibly-stretchable layer 65 to its initial shape with the height H1, bringing central portion 67 of reversibly-stretchable layer 65 back to a lesser stretched state. The bumping out and retracting of a disk-like element 67 of the reversibly-stretchable layer 65 can be described as a repeatable zipping motion of this layer 65. Also, the reversible bumping-out or zipping of the central portion of reversibly-stretchable layer 65 on top of central area 14 of cavity 10 serves as an actuator element that can be sensed by a user, or used for different types of actuation systems. The pair of electrodes 30 are made of a flexible electrode material, and bottom electrode 32 can be patterned onto the substrate 20, and the top electrode 34 can be patterned onto the top dielectric layer 54, for example made of polymer. The portions of top electrode 34 that is moving up and down by the electrostatic force forms a disk or ring around the central part 14 of cavity 10.

Figure 2E:
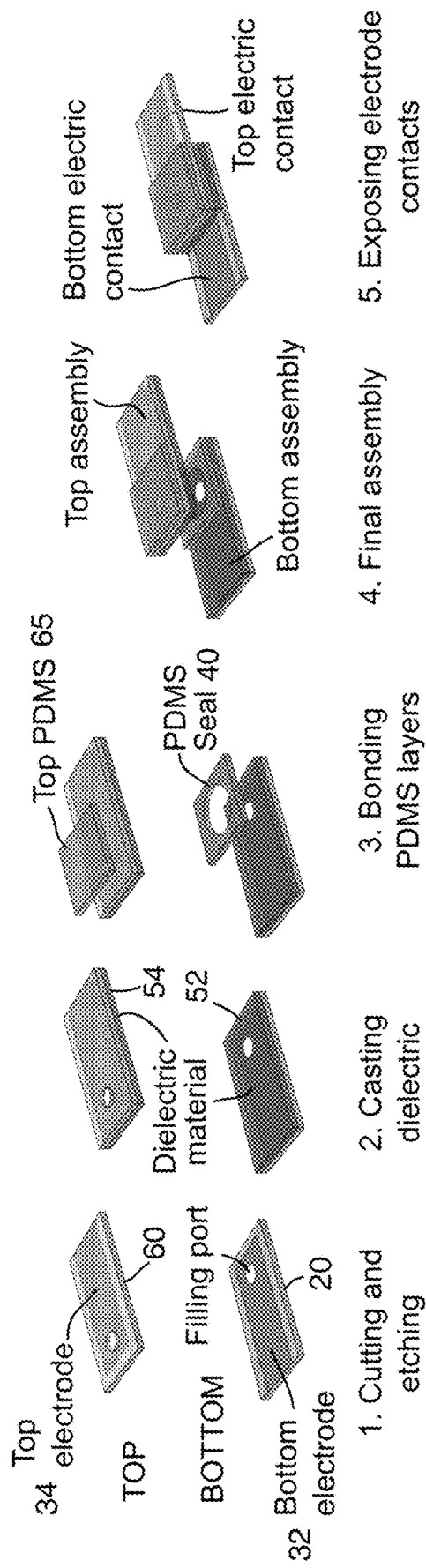
Figure 2F:
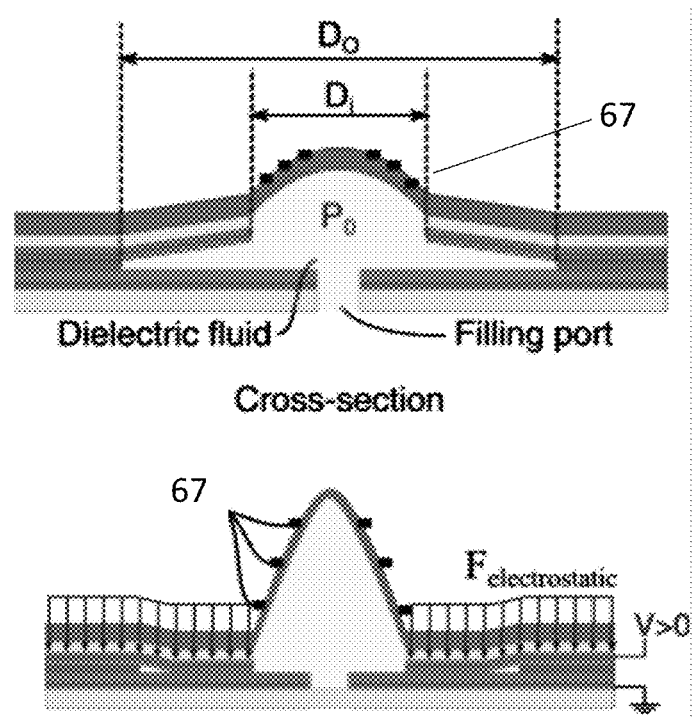

According to another aspect, as exemplarily shown in FIG. 2F with a cross-sectional view, central part 67 of reversibly-stretchable layer 65 can be patterned with rigid fibers 68, so that the deformation of central part 67 can be tuned. For example, the rigid fibers 68 can be made of PET, Mylar and thereby be made of the same material of the flexible layer 60. The rigid fibers can also be made to be heat-activated, for example made of shape-memory polymer (SMP). With respect to their arrangement, the rigid fibers 68 could be concentrically arranged around central axis CA to form a plurality of reinforcement rings of different diameters, so that upon actuation the central part 67 can deform in a cone shape instead of a spherical shape, depending on the configuration of central part 67 of reversibly-stretchable layer 65. This could happen if the cavity volume 10 is relatively large. This would allow to concentrate the displacement formed by apex of central part 67 of reversibly-stretchable layer 65 in a vertical direction, and avoid lateral expansion, as the rings of rigid fiber would substantially inhibit any lateral expansion. This could therefore increase the total displacement of H2. In another variant, it is possible to use shape memory material for central part 67 of reversibly-stretchable layer 65, for example a shape memory polymer (SMP) membrane, to allow actuation and then a fixing of the expanded position, so that the actuation voltage can be withdrawn without the retracting of the central part 67, as shown in U.S. Pat. No. 10,240,688, this reference herewith incorporated by reference in its entirety. For this purpose, central part 67 would require an arrangement that allow to change its temperature, for example a heater by a conductive mesh that is arranged with central part 67, or by heating fluid 70.

According to some aspects of the present invention, the herein presented HAXEL actuator 100 combines the advantages of using non-stretchable but flexible electrodes and dielectric materials with the advantages of having a stretchable interaction membrane, formed by the reversibly-stretchable layer 65, allowing higher out-of-plane strain than the state of the art actuators, for example the HASEL actuators, by using elastomer materials for the displacing element, for example for top reversibly-stretchable layer 65, yet retaining the high energy density thanks to the use of polymers for the pair of flexible dielectric layers 50 with high breakdown voltage and high permittivity. Moreover, electrode pairs 30 can also be used to measure a state of the electrodes, for example the distance between top and bottom electrode 32, 34, for example by grounding one of the electrodes and by applying a frequency signal to the other electrode, to perform capacitive sensing. This signal could be superposed to the voltage actuation signal and would allow to have a real-time feedback on the state of the HAXEL actuator 100. Moreover, it is possible to reduce the actuation voltage by reducing a thickness of the dielectric layers 50, minimizing a thickness of sealing layer 40, reducing a height of cavity 10, and providing for an optimized shape of cavity 10.

Figure 5:
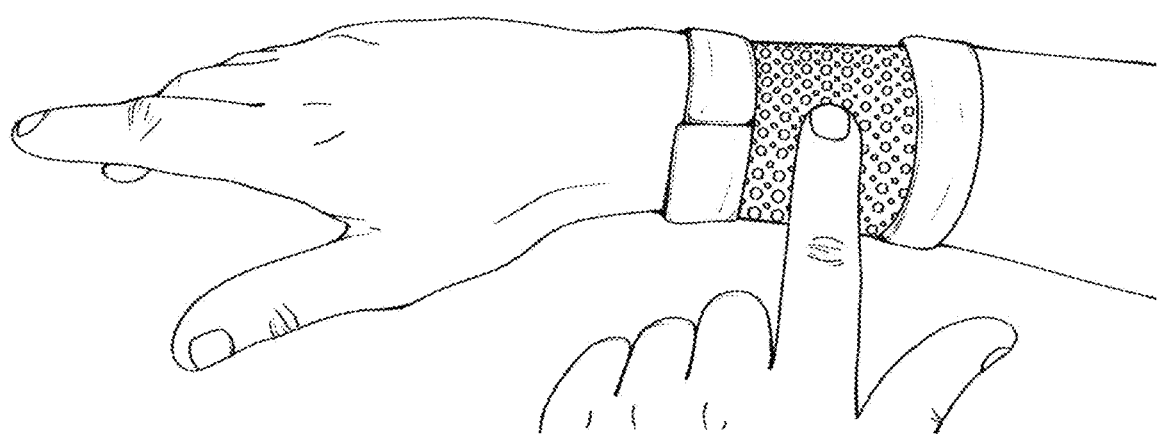
FIG. 5 showing an application of a HAXEL matrix that can be worn on a skin of a user, according to another aspect of the present invention.

In the exemplary embodiment, for example the one illustrated with a perspective top view in FIG. 2A, the 6 mm×6 mm×1 mm can generate 300 mN force and displacements of 500 µm as the difference between heights H1 and H2 in a low-profile geometry adapted to the fabrication flexible actuator arrays. This device offers high force density (0.8 N/cm2), has a fast response time (~5 ms), and a broad frequency response, with up to 300 mN blocked force at 80 Hz and 100 µm peak-to-peak free displacement at 200 Hz. Specific energy and power of the active part of 0.51 J/kg and 102 W/kg. By virtue of its extremely thin form factor and compliance, arrays of HAXELs are promising for dense, flexible and lightweight haptic interfaces for virtual reality such as gloves, bracelets, and sleeves, but also patches for any body part, see for example the application represented in FIG. 5. The table of shown in FIG. 1D, compares different features and parameters of DEA, HASEL and HAXEL devices.

Figure 4A:
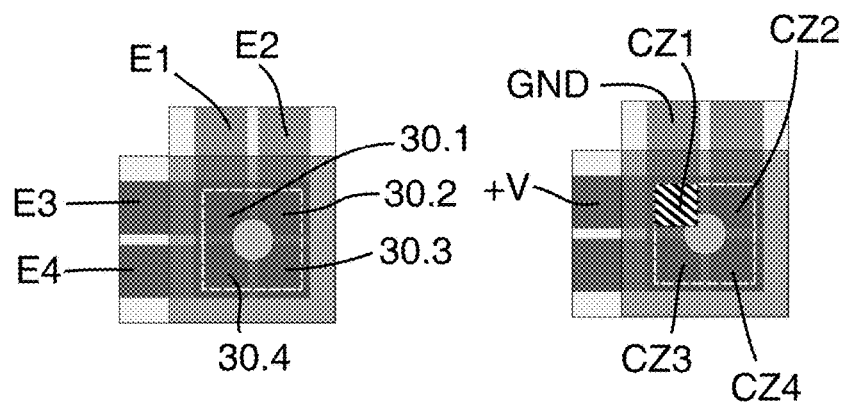
FIGS. 4A to 4C show different aspects of a HAXEL actuator 200 having a plurality of compression zones CZ, in the variant shown four (4) exemplary compression zones CZ arranged at corners of cavity 10, with FIG. 4A showing a top view of a schematic representation of a HAXEL actuator 200 having four (4) exemplary compression zones CZ1 to CZ4 at each corner of a square-shaped cavity 10, CZ1-CZ4 formed by four pairs of electrodes.
Figure 4B:
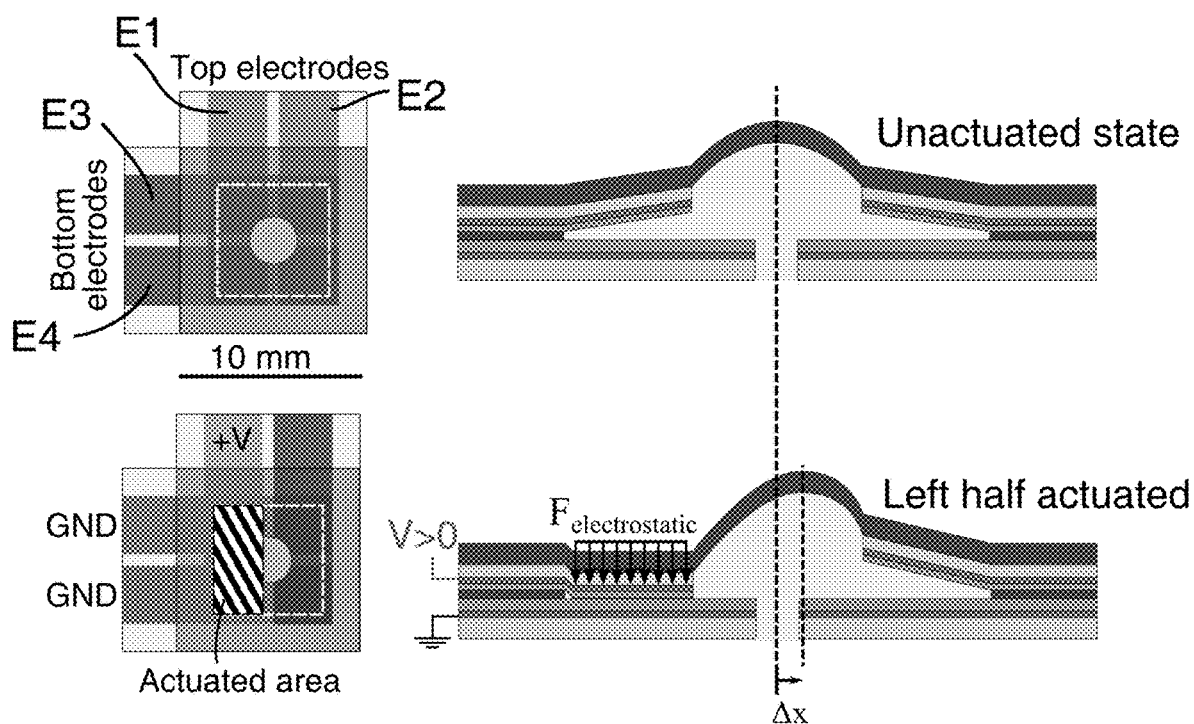

FIGS. 4A to 4C and FIG. 8 show an exemplary representation of a HAXEL actuator 200 that does not only have one compression zone CZ, but two or more compression zones, in the variant shown four (4) compression zones CZ1 to CZ4, that are located between four (4) pairs of electrodes 30.1, 30.2, 30.3, and 30.4. By using such segmented electrode pairs 30.1, 30.2, 30.3, and 30.4, it is possible not only perform a linear up and down motion of central part 67 of stretchable membrane 65 along axis CA, but it is also possible to combine the up- and downward motion with selective lateral motion, to also shift it north/south and east/west, for example to create rotation-like motion. FIG. 4A shows a central opening 45 in sealing layer 40 that has a square shape, with each pair of electrodes 30.1, 30.2, 30.3, 30.4 arranged in each corner of the square, to each form a compression zones CZ1 to CZ4 in the corners of cavity 10. Other multiple electrode pair arrangements are also possible, for example a three (3) electrode pairs at each corner of a triangle that defines central opening 45, five (5) or more electrode pairs arranged as segments of a circle around central axis CA, or other variants.

Figure 4C:
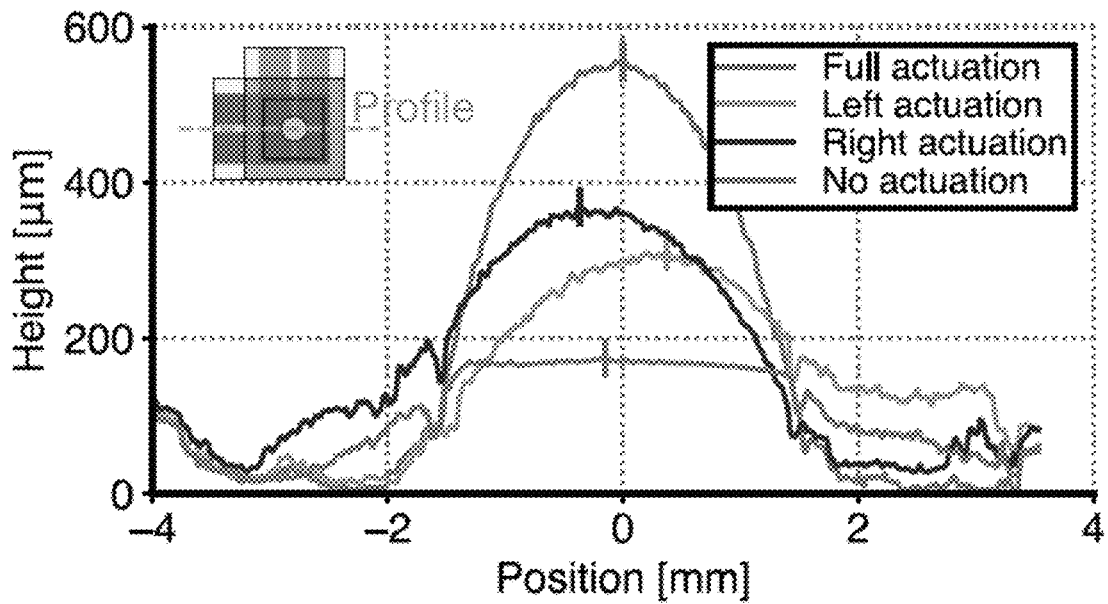

With respect to the illustration of FIG. 4A on the right side, with the actuation of CZ1, central part 67 of stretchable membrane 65 will move not only upwards, but can also move laterally, for example diagonally downward to the right side. The example of the right side movement is shown with FIG. 4B, where two electrode pairs 30.1 and 30.3 are under voltage and compressing compression zones CZ1 and CZ3, leading to a protrusion of central part 67 of stretchable membrane 65 to the left, opposite side. This also leads to a lateral displacement of apex of central part 67 by a distance Δx of the central axis CA. Moreover, to simplify the control of electrode pair and their compression, it is possible to combine the electrodes together for addressing the compression of the four zones CZ1-CZ4, by using columns of electrode strips E1, E2 and rows of electrode strips E3, E4, instead of having eight (8) different electrode connections to address all pair of electrodes 30.1, 30.2, 30.3, 30.4. In this respect, with the example shown in FIG. 4B, top electrodes of electrode pairs 30.1 and 30.3 that are formed by strip E1 be put to actuation voltage V+, while bottom electrodes of electrode pairs 30.1 and 30.3 that are formed by strip E3 and E4, respectively, can be put to ground GND for activation. This results in an actuation or compression of compression zones CZ1 and CZ3. FIG. 4C exemplarily shows a graph that represents a vertical extension profile of reversibly-stretchable layer 65 and a height of extension as a function of a location on central axis CA, showing that an apex or summit of the bumped-out central part 67 of reversibly-stretchable membrane 65 moving left and right of central axis CA with left or right actuation. As shown in this figure, with the left or right actuation, a 740 µm lateral displacement away from CA is shown, with a vertical displacement of 380 µm in full actuation.

FIG. 8 shows a table with different actuation states and sequences that can be performed by HAXEL actuator 200 with four (4) compression zones CZ1 to CZ4, including front and back motion of expanded, central part 67 of reversibly-stretchable membrane 65, a rotation of expanded, central part 67 with four different positions, a relaxed non-expanded states, up and down motion (like HAXEL actuator 100), and a left and right motion. This motions are done selectively activating one of the compression zones CZ1-CZ4, or two or more simultaneously, as exemplarily visualized in the lower row of the table. In this respect, the HAXEL actuator 200 form a multi degree-of-freedom actuator that can be used for an actuator array, for example like the one shown in FIG. 2B.

An array of actuators 400, shown in FIG. 2B can be manufactured by the process that is described in FIG. 2E. It is possible to activate each HAXEL actuator 100 of the array 400 individually using a row/column addressing without cross-coupling. This technique allows driving several actuators 100 from the same line or the same column but some patterns cannot be obtained, for example the outer border of square of 3×3 actuators 100 with a deactivated actuator in the middle. It could still be possible to obtain this kind of pattern by refreshing the actuators 100 one by one at high speed using a dedicated electronics. Another method could be to use individual electrodes routed on a flexible printed-circuit board (PCB) that serves as a somewhat flexible base 20, such that bottom electrodes 32 are directly patterned onto base 20. Thereafter, bottom dielectric layer 52 and other layers can be can be deposited onto the patterned PCB. This allows to directly integrate electronics to a patterned PCB. While base 20 can be flexible, it should not be stretchable, or if so it should be substantially stiffer than the reversible-stretchable membrane 65. Such a lightweight, flexible array 400 could be used as a display for blind user or integrated in a sleeve for applications such as virtual reality, see for example the exemplary representation of FIG. 5.

Some experimental tests have been made to further quantify design parameters, predicted actuation force and displacement characteristics. HAXEL actuators 100 and arrays 400 thereof are made of flexible membranes assembled in a cavity 10 filled with dielectric fluid 70. As explained above, an electrostatic pressure is generated on the edge or periphery of cavity 10 and causes the upper movable parts including top dielectric layer 54, top electrode 34, top flexible layer 60, and reversibly-stretchable layer 65, to zip down to the bottom membrane, pushing the fluid into the central part 14 of cavity 10. A central part 67 of stretchable membrane 65 is deformed upwardly and produces displacement and force.

The use of a stretchable central membrane adds several important features particularly interesting for haptic feedback and actuator array fabrication. For example, the stretchable membrane 65 has a mechanical impedance close to finger skin and can conform to its surface. This offer a coupling between the contact surface area and the applied force that is similar to natural interaction. Moreover, the stretchable membrane 65 offers a high anisotropy of the actuator behavior. With the principles of operation of the HAXEL actuator 100 it is possible to obtain only a movement in one direction, for example an out-of-plane movement along axis CA for a haptic taxel as shown with the embodiment of the HAXEL actuator 100, but it is also possible to provide for a multi-directional movement, as shown with HAXEL actuator 200. With HAXEL actuator 100, cavity 10 can changes shape the shape in only one direction when the fluid is injected from peripheral areas 12 to central area 14 of cavity, having axi-symmetric arrangement around axis CA, so that it is possible to easily build arrays of actuators without the need for stress relieving structures between different actuators.

Figure 6:
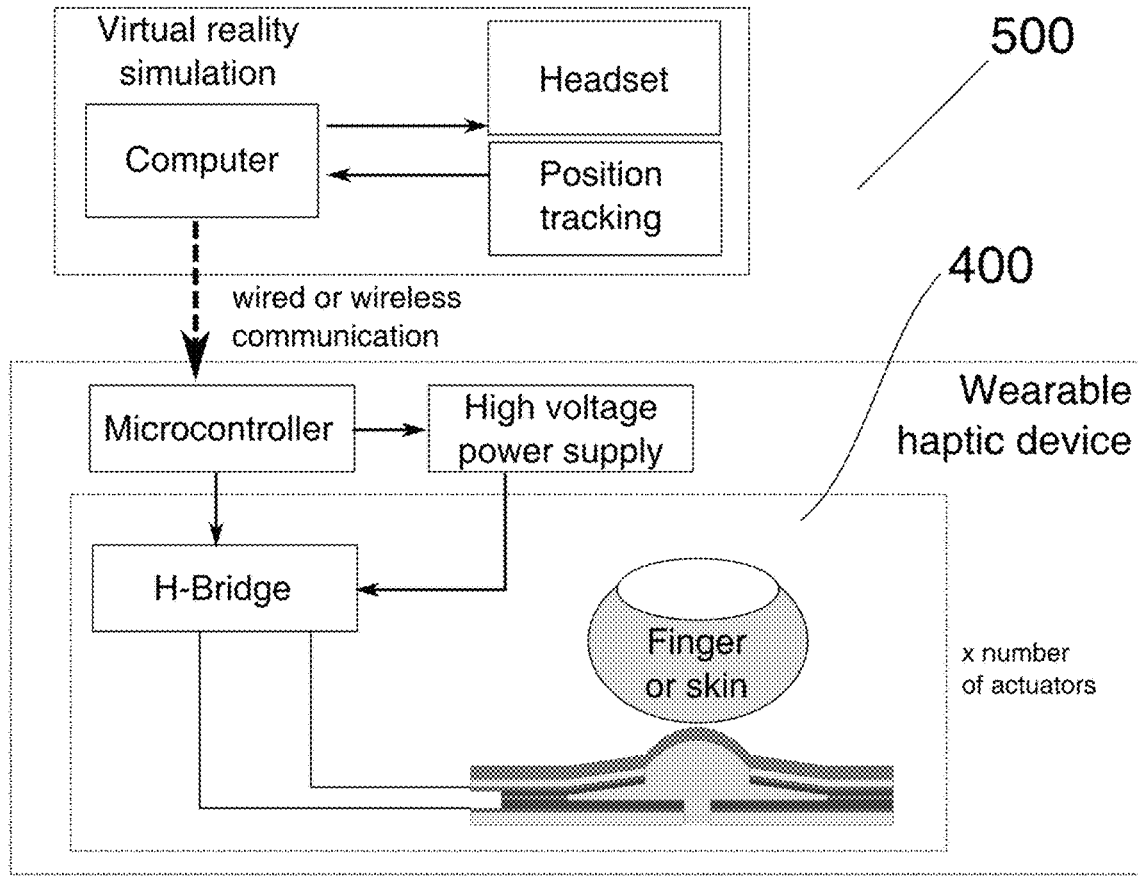
FIG. 6 exemplarily shows a schematic representation of a virtual reality system 500 that includes a virtual reality simulation device including a computer, a headset, and a position tracking device, and a wearable haptic device that itself includes a matrix 400 of HAXEL actuators 100, according to still another aspect of the present invention.

Furthermore, as the suggested design relies on a rigid base, it is also possible to use any kind of substrate for actuators 100, 200. HAXEL actuators 100, 200 could be fabricated directly onto a flexible circuit board (FCB) or other type of printed circuit board for integration with the necessary control electronics, including but not limited to voltage sources for actuation, switches and other power electronics for controlling voltage application to the electrode pairs 30, data input and data processing controllers, and array voltage drivers. In this respect, FIG. 6 shows a virtual reality system 500 that includes a virtual reality simulation device including a computer, a headset, and a position tracking device, and a wearable haptic device that itself includes a matrix 400 of HAXEL actuators 100, a high voltage power supply, a microcontroller, and an H-bridge circuit for selectively powering the HAXEL actuators 100. Virtual reality simulation device s in wireless or wired communication connection with the wearable haptic device, for providing sensatory feedback to the user that wears the haptic device.

In addition, with the stretchable membrane or layer 65, a built-in preloading of the actuator 100, 200 is provided. In addition, the spring effect of elastic and flexible membrane or layer 60 provides for a pre-loiding for restoring the actuator back to an initial state, without the need of any other active device. With HAXEL actuators 100, 200, the initial pressure of fluid 70 inside cavity 10 can be tuned so that the response time of the actuator is reduced and the free displacement frequency response is improved. The ability to tune separately a thickness and geometry of the elastomer for the reversibly-stretchable membrane 65, and a thickness and geometry of the polymer for the flexible membrane or layer 60, a very large design freedom is provided.

FIGS. 2A and 2B shown perspective views of two adjacently arranged HAXEL actuators (FIG. 2A) and an 8×8 array arrangement therefor (FIG. 2B). The substrate layer 20 can be of any thickness and serves as support for the bottom electrode 32 and the bottom dielectric layer 52, and forms a rigid base. The sealing layer 40 ensures fluid proof bonding of the top electrode 34 to the dielectric layer, and it should be as thin as possible, preferably less than 5 µm, more preferably less than 3 µm. Preferably, side walls of the sealing layer 40 that face cavity 10 should be very thin, such that sealing layer 40 can be made to be tapered or thinned out towards cavity 10, so that its thickness at the cavity is close to zero. The top electrode 34 can be patterned on the top flexible layer or membrane 60. The top reversible-stretchable membrane or layer 65 can made from a soft PDMS that is deformed into a bump-shape by the compression of compression zone CZ upon actuation.

Figure 7A:
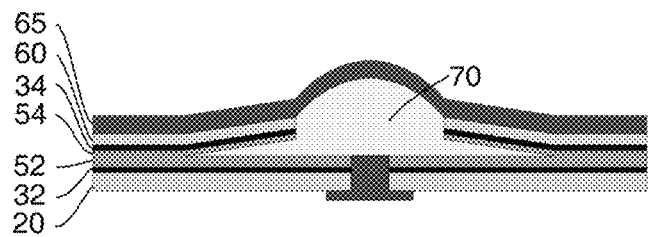
FIGS. 7A and 7B show of alternative embodiments of the structure of HAXEL actuators 100, with FIG. 7A showing cross-sectional view of the layers for HAXEL actuators 100, and FIG. 7B showing top views of central openings 45 having zig-zagged or other types of protruding edges.
Figure 7A:
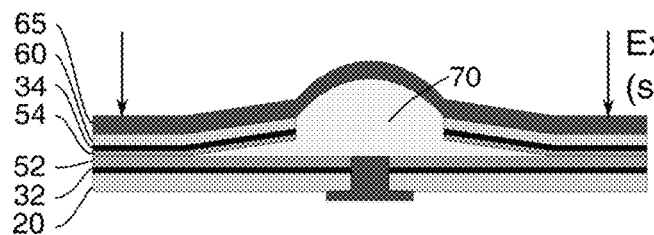
Figure 7A:
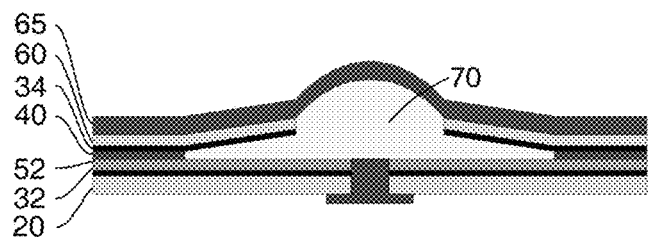

FIG. 7A shows three (3) different cross-sectional views of the layers that form the HAXEL actuator 100 for three (3) different alterative embodiments. For example, the first representation shows a variant where the sealing layer 40 is not present, but the central part 45 of cavity is formed within the dielectric layer 50, the dielectric layer still forming an upper and lower layer 52, 54, that are either bonded or integrally formed. For example, such structure could be formed from a single dielectric layer that has a sacrificial layer that could be removed to form cavity 10. The middle representation shows a variant where the sealing layer 40 is not present, but the dielectric layers 52, 54 are separate layers that are pressed or otherwise fixed towards each other by an external force, for example a press frame, clamps, screws, etc. The lower representation shows an embodiment where there is only one dielectric layer 52 that is located on top of the bottom electrode 32, but the upper dielectric layer 54 is not present.

Figure 7B:
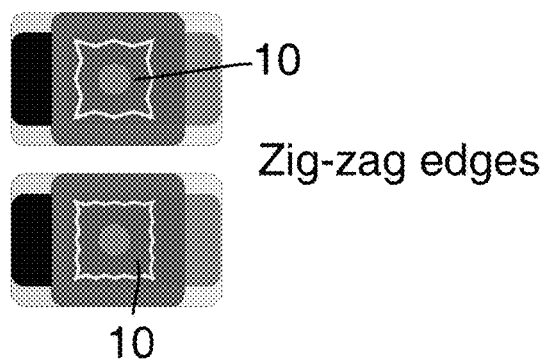

With respect to the cross-sectional exemplary view of the HAXEL actuator 100 shown in FIG. 2D, different geometries are possible, with respect to a view along central axis CA. For example, actuator 100 may or may not have axi-symmetrical arrangement around axis CA. Zipping action can be improved by choosing shapes with pointy corners, for example square or star-shaped cavities 10, or cavities having a rugged shape or having several lateral protrusions, zig-zagged edges, see for example FIG. 7B. The outer diameter Do defines the overall lateral size of the HAXEL actuator 100. The larger the actuator 100, the higher a force and displacement it will produce. Di is the diameter of the actuated soft deformable part, being central section or portion 67 of reversible-flexible layer 65. A smaller Di leads to a larger displacement of the central portion 67. The choice of the dielectric fluid 70 has a limited effect on the static characteristics of the actuator 100, it has mostly the role of a movement amplifier. Its density and viscosity will affect the frequency response of the actuator. A fluid compatible with PDMS should be chosen, for example but not limited to an oil such as FR3 dielectric oil, a silicone prepolymer, or as 3M™ Fluorinert™ FC-40.

A scalable, parallel process or method for building flexible arrays of millimeter scale actuator is in FIG. 2E with simplified method stages. The fabrication process of HAXEL actuator 100, 200 solved several challenges, including a strong bonding of the top PDMS membrane for the reversible-flexible layer 65 to the top flexible membrane or layer 60, using high quality thin dielectric material for the pair of dielectric layers 50 while preserving the structural strength of cavity 10, the sealing of cavity 10 that should be as thin as possible for dielectric actuation while being strong and fluid proof, the sealing process has to be low temperature (<100° C.) to work with temperature sensitive material such as P(VDF-TrFE-CTFE), and the process or method should be scalable and highly parallel to build large, dense array of actuators 100, 200.

The different layers are first cut using a $CO_2$ laser. The outer diameter, inner diameter and seal shape of sealing layer 40 are defined in the production files. The top and bottom electrodes 30 are masked and etched to ensure clearance on the sides and avoid arcing through the air. A mix of solvent and polymer material is applied directly onto the electrodes 30. It is possible to use a large variety of dielectric materials, thermoplastic polyurethane (TPU) have been successfully used but P(VDF-TrFE-CTFE) is the polymer that has been used for the experimental tests. Thin dielectric layers for dielectric layer pair 50 can easily be deposited (<5 µm) for lower voltage dielectric actuation. A 5 µm polyvinylidene fluoride or polyvinylidene difluoride (PVDF) layer is typically used on the top electrode layer 34 and a 15 µm layer is deposited on the bottom side. Because of the relatively thick (20 µm) sealing layer 40, it is difficult to reduce further the thickness of the dielectric layers 50. In the future, thinner sealing layers associated to a thinner dielectric material will be used, leading to the same performance at lower voltage. A silanization process is used to bond the PDMS of the reversible-flexible layer 65 to the thermoplastic membranes that form flexible layer 60.

This manufacturing method has been tested with the materials Mylar, PVDF, and TPU with success, for sealing layer 40, pair of dielectric layers 50, flexible layer 60, reversibly-stretchable layer 65, and their respective bonding. Once reversibly-stretchable layer 65, formed from PDMS, is bonded to the flexible layer 60, formed as a Mylar membrane, and sealing layer 40 (forming a PDMS seal) is bonded to bottom dielectric layer 52, sealing layer 40 is exposed to $O_2$ plasma and top flexible electrode 54 is bonded to sealing layer 40, completing the actuator assembly, as shown in FIG. 2E. In variants, sealing layer 40 can be heat sealable by a thermal treatment, with an exemplary thickness of about 3 µm. The plasma bonding method is a low temperature process that does not damage the dielectric layers 50 and can work with temperature sensitive material such as P(VDF-TrFE-CTFE) which has a melting temperature of about 125° C. Moreover, a planar check valve is used to fill each cavity 10 of actuator 100 of an array with a fluid 70 at a same pressure, via the fluid ports 25, and the fluid ports 25 are thereafter sealed with a plug. In a variant, no filling port needs to be present, but the fluid 70 can have been provided during assembly of the layers, for example but not limited to a pre-filled pouch, deposition of the fluid 70 into cavity.

Figure 3A:
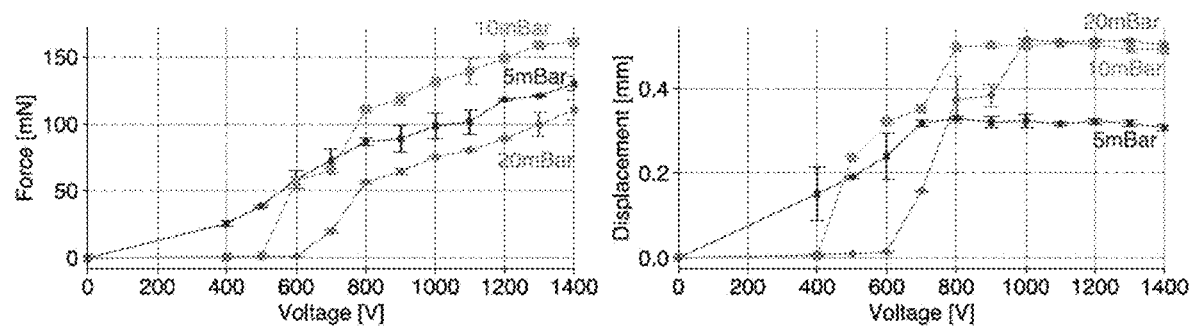
FIGS. 3A to 3C shows different graphs representing force and displacement as a function of the actuation voltage for various different parameters, with FIG. 3A showing displacement and force for different inner pressure of the cavity, for Do=6 mm, Di is 2.5 mm, top PDMS thickness is 50 μm, seal shape is square, FIG. 3B showing displacement and force for different inner cavity diameters, with Do=6 mm, top PDMS thickness is 50 μm, seal shape is square, initial pressure is 10 mBar, FIG. 3C showing displacement and force for two different seal shapes, with Do=6 mm, Di=2.5 mm, top PDMS thickness is 50 μm, initial pressure is 10 mBar.

With respect to the characterizing HAXEL actuators 100, 200, FIG. 3A shows the force and displacement response of a 6 mm square sealing layer 40 actuator with an inner diameter Di of 2.5 mm at different initial fluid pressures inside cavity 10. On both graphs, it can be observed that the initial pull-in voltage increases with respect to the initial pressure. The maximum force of 160 mN is obtained for 10 mBar and it drops to around 100 mN at 20 mBar. The maximum displacement is reached for pressures above 10 mBar. It appears that higher pressures inside cavity 10 lead to a better frequency response of the actuator 100, especially in terms of free displacement. The peak-to-peak displacement is improved by 30% for frequencies above 40 Hz at 20 mBar compared to 10 mBar, due to a shorter pull-out of the actuator.

Figure 3B:
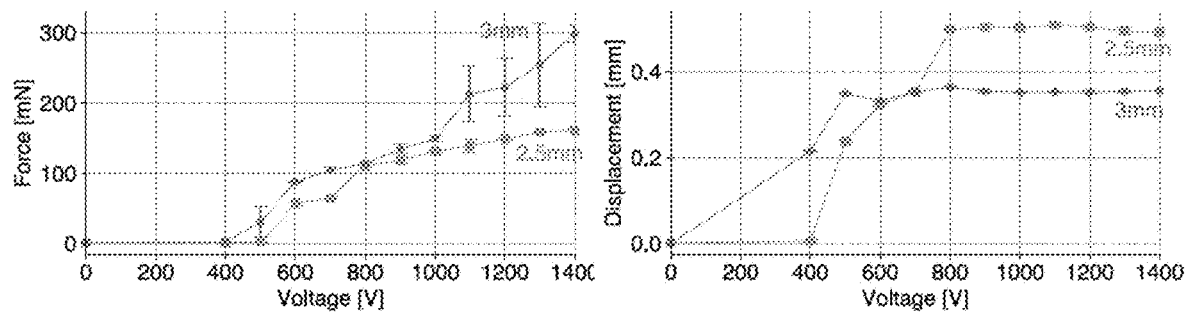
Figure 3C:
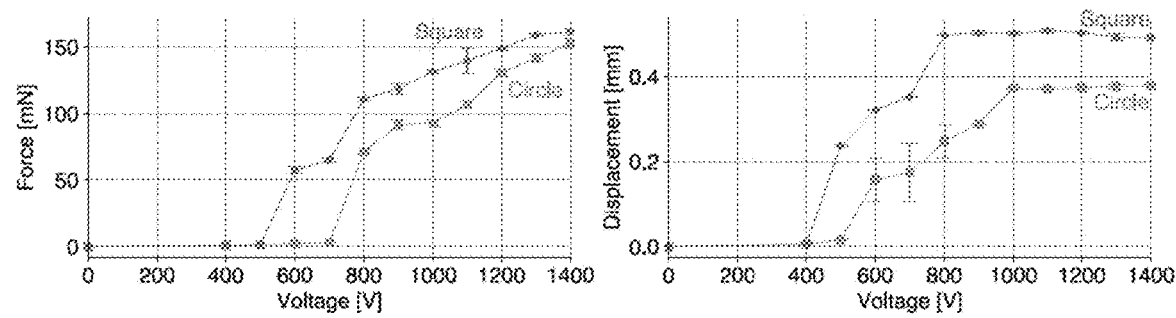

FIG. 3B shows the force and displacement response as a function of the activation voltage for embodiments with two different inner diameters Di that are 2.5 mm and 3 mm and Do is 6 mm, with a 6×6 mm square seal shape, having 10 mBar initial pressure. The force response shows that a larger inner diameter leads to a larger blocked force, 250 mN for 3 mm, 160 mN for 2.5 mm, the ratio of forces is 1.56 which is in the order of magnitude of the inner area ratio of 1.44. It appears that increased surface area of contact of reversibly-stretchable membrane 65 with the force sensor used produces more force. The pull-in voltage is lower with a larger inner diameter Di. This is due to a reduced increase in pressure when zipping is initiated. The displacement is increased with a smaller diameter, the variant with a 2.5 mm inner diameter Di reaches a displacement of 0.5 mm while the variant with a 3 mm inner diameter Di reaches 0.36 mm. It can be observed that the ratio of these displacement (0.5/0.38=1.39) is also close to the inner area ratio (1.44). The activation The shape of cavity 10 seen in a direction of central axis CA can have different forms, for example but not limited to circular, oval, square, polygon, star-shape, square. This can be defined by the shape of the cut-out or central opening 45 in the sealing layer 40. A circular shape of central opening 45 with an outer diameter 6 mm, and a 6 mm side square shaped cavity have been tested. It shows that the square-shaped cavity 10 somewhat improves the zipping behavior of HAXEL actuators 100, 200. When the compression zone CZ contracts by the approaching of the pair of electrodes 30, the fluid 70 will first evacuate from the corners with a softer increase in pressure in cavity 10 as compared to the circular cavity. FIG. 3C shows the force and displacement as a function of the applied voltage for the different cavity shapes, defined by the cut-out or central opening 45 in sealing layer 40. It can be observed that the maximum force is higher for the square seal for any voltage. The square-shaped central opening 45 in sealing layer 40 variant starts exerting a blocking force for voltages above 600V while the circular shape variant pulls in at 800V. On the displacement chart, 20% much displacement is observed for the square-shaped central opening 45 in sealing layer 40 at the maximum voltage.

The specific energy of a 6×6 square actuator with a 3 mm inner diameter has been evaluated based on the indentation of an activated actuator 100, and an actuator 100 weighing 90 mg produces 15.30 giving a force density of 0.17 J/kg and a power density of 34 W/J. This calculation takes into account all the passive parts such as the electrodes 30 contact and the filling valve which have a significant mass compare to the active part. The energy and power density of the active part only (30 mg) is 0.51 J/kg and 102 W/kg.

As shown in the table of FIG. 1D, there herein presented HAXEL actuators 100, 200 have almost twice the force density of other types of dielectric elastomer actuator haptic devices. Their energy density is comparable to a donut HASEL actuator and slightly lower than DEA devices. If only the weight of the elements as shown in FIG. 2C including fluid 70 is considered, HAXEL outperforms most DEA devices. HASEL actuators have better metrics overall especially Peano-HASEL, it is difficult to understand if it is due to the HAXEL structure by itself or from a scaling effect given that no comparable size HASEL actuator have been reported.

Next, an example of a manufactured actuator 100 is given with its process stages. The layers (substrate 20: 100 μm metallized Mylar, Sealing layer 40: 20 μm Wacker Elastosil 2030 PDMS, top flexible membrane or layer 60: 12 μm metallized Mylar, top stretchable membrane or layer 65: 50 μm Wacker Elastosil 2030 PDMS) are cut using a Trotec Speedy 300 laser cutter. A solid ink printer (Xerox ColorQube 8580) is used to mask the aluminum electrode before etching, to form the electrode pair 30. P(VDF-TrFE-CTFE) dielectric material dissolved in Methyl Ethyl Ketone solvent is applied using a Zehntner ZAA 2300 applicator. A 15 μm dielectric thickness is applied on the substrate layer 20 and a 5 μm thickness is applied on the top electrode 34, to form the dielectric layers 52, 54. Access to the electrode is ensured by removing the dielectric locally using acetone, good electric contacts are ensure using conductive silicone adhesive on the metallized side. For bonding reversibly-stretchable layer 65 and sealing layer 40, being both stretchable layers, that can be made from PDMS, together with flexible layer 60, and top and bottom dielectric layers 52, 54, being flexible layers, these layers can be first exposed to an $O_2$ plasma (Diener Zepto 40 kHz plasma) for 2 min at 100 W. They are then soaked into a silanization solution composed of a 5% of (3-Aminopropyl)trimethoxysilane (APTMS [25]) in $H_2O$ for 30 minutes at 50° C. The flexible layers (60, 54, 52) are then dried and softly clean with isopropanol. The stretchable layers (65, 40) to be bonded is exposed to $O_2$ plasma (50 W power during 60 s) and placed in contact with the flexible membrane (60, 54 or 52). The resulting assembly is placed under pressure (between two glass plate) at 80° C. for 2H.

According to some aspects of the present invention, and to summarize the superior results and advantages of the herein presented HAXEL actuators 100, 200, a new actuator design is presented, adapted to the fabrication of very thin, flexible dense arrays 400 of cutaneous actuators. HAXEL actuators 100, 200 can displace a dielectric fluid 70 by a zipping motion to flow liquid from the periphery 12 to the center 14 of a cavity 10 to deform a PDMS membrane for reversible-stretchable layer 65. The device has the advantages of liquid-based dielectric actuator i.e. high reliability because of non-stretchable electrodes, high quality dielectric material and breakdown proof structure while being specifically adapted to arrays 400 of actuators. According to another aspect of the present invention, a low-temperature, scalable production process or method is presented, preferably based on $O_2$ plasma bonding of laser cut membranes which is well adapted to the fabrication of actuator batches and arrays 400 even with temperature sensitive material such as PVDF terpolymer. The herein presented HAXEL actuator 100 can generate forces up to 300 mN and stroke of 0.5 mm for a 6 mm×6 mm×1 mm actuator at 1.4 kV. The device characteristics can be tuned by changing the inner diameter of cavity 10 and initial pressure of the fluid 70 of the actuator 100. The use of a square cavity improves the response of the actuator 100 with larger force and displacement due to a larger cavity and reduced actuation voltage. In addition, the fabrication of an 8×8 actuator array 400 has been demonstrated, that could be applied to applications in haptic displays or microfluidics.

Moreover, the herein presented HAXEL actuators 100 are electrically-controlled, fast and low-profile devices that reaches level of force and displacement that are novel for flexible haptic devices for VR applications. There herein shown 3 mm HAXEL forces of the actuator 100 are almost ten (10) times larger than the human perceptual threshold. HAXEL actuator force density of 0.8 N/cm2 is larger than the best similar size dielectric elastomer actuator that are known. Their low mass of 90 mg could enable the fabrication of haptic gloves with a thousand integrated actuators weighing only 90 g. Their fast response (<10 ms) and broad force and displacement bandwidth could enable rich and natural virtual reality interaction.

In addition, depending on the configuration of the compression zones CZ and the pair of electrodes, the actuators 200 are also capable of both of out-of-plane motion and in-plane motion, thus providing both normal and shear forces to the user. When a voltage is applied electrodes, the fluid is forced into the central region, pushing up the elastomer. A 6 mm×6 mm×1 mm actuator weighs 90 mg, generates forces of over 300 mN and displacements of 500 μm. The response time is below 10 ms. In user tests, human subjects distinguished normal and shear forces with over 95% accuracy. We report an 8×8 flexible array of HAXELs suitable for integration in a haptic glove, sleeve or for use as a display for blind or visually impaired users.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it has the full scope defined by the language of the following claims.

REFERENCES

[1] S. Biswas and Y. Visell, "Emerging Material Technologies for Haptics," Adv. Mater. Technol., vol. 4, no. 4, p. 1900042, 2019, doi: 10.1002/admt.201900042.

[2] "Dot Watch—In touch with the world. From your wrist.," 2019. https://www.dotincorp.com/(accessed Oct. 31, 2019).

[3] J. J. Zárate and H. Shea, "Using Pot-Magnets to Enable Stable and Scalable Electromagnetic Tactile Displays," IEEE Transactions on Haptics, vol. 10, no. 1, pp. 106-112, January 2017, doi: 10.1109/TOH.2016.2591951.

[4] Y. Haga, W. Makishi, K. Iwami, K. Totsu, K. Nakamura, and M. Esashi, "Dynamic Braille display using SMA coil actuator and magnetic latch," Sensors and Actuators A: Physical, vol. 119, no. 2, pp. 316-322, April 2005, doi: 10.1016/j.sna.2004.10.001.

[5] Y. Jansen, T. Karrer, and J. Borchers, "MudPad: tactile feedback and haptic texture overlay for touch surfaces," in ITS '10, ACM (2010), 2010, pp. 11-14, doi: 10.1145/1936652.1936655.

[6] "HaptX|Haptic gloves for VR training, simulation, and design," HaptX, 2019. https://haptx.com/.

[7] A. Russomanno, Z. Xu, S. O'Modhrain, and B. Gillespie, "A pneu shape display: Physical buttons with programmable touch response," in 2017 IEEE World Haptics Conference (WHC), June 2017, pp. 641-646, doi: 10.1109/WHC.2017.7989976.

[8] X. Wu, S. H. Kim, H. Zhu, C. H. Ji, and M. G. Allen, "A Refreshable Braille Cell Based on Pneumatic Microbubble Actuators," J. Microelectromech. Syst., vol. 21, no. 4, pp. 908-916, August 2012, doi: 10.1109/JMEMS.2012.2190043.

[9] Y. Qiu, Z. Lu, and Q. Pei, "Refreshable Tactile Display Based on a Bistable Electroactive Polymer and a Stretchable Serpentine Joule Heating Electrode," ACS Appl. Mater. Interfaces, vol. 10, no. 29, pp. 24807-24815, July 2018, doi: 10.1021/acsami.8b07020.

[10] N. Besse, S. Rosset, J. J. Zarate, and H. Shea, "Flexible Active Skin: Large Reconfigurable Arrays of Individually Addressed Shape Memory Polymer Actuators," Adv. Mater. Technol., vol. 2, no. 10, p. 1700102, October 2017, doi: 10.1002/admt.201700102.

[11] H. S. Lee et al., "Design analysis and fabrication of arrayed tactile display based on dielectric elastomer actuator," Sens. Actuators, A, vol. 205, pp. 191-198, January 2014, doi: 10.1016/j.sna.2013.11.009.

[12] S. Mun et al., "Electro-Active Polymer Based Soft Tactile Interface for Wearable Devices," IEEE Transactions on Haptics, vol. 11, no. 1, pp. 15-21, January 2018, doi: 10.1109/TOH.2018.2805901.

[13] H. Zhao, A. M. Hussain, A. Duduta, D. M. Vogt, R. J. Wood, and D. R. Clarke, "Compact Dielectric Elastomer Linear Actuators," Adv. Funct. Mater., vol. 28, no. 42, p. 1804328, 2018, doi: 10.1002/adfm.201804328.

[14] Z. Yu et al., "Bistable electroactive polymers (BSEP): large-strain actuation of rigid polymers," in Electroactive Polymer Actuators and Devices (EAPAD) 2010, April 2010, vol. 7642, p. 76420C, doi: 10.1117/12.847756.

[15] E. Acome et al., "Hydraulically amplified self-healing electrostatic actuators with muscle-like performance," Science, vol. 359, no. 6371, pp. 61-65, January 2018, doi: 10.1126/science.aao6139.

[16] N. Kellaris, V. Gopaluni Venkata, G. M. Smith, S. K. Mitchell, and C. Keplinger, "Peano-HASEL actuators: Muscle-mimetic, electrohydraulic transducers that linearly contract on activation," Sci. Robot., vol. 3, no. 14, p. eaar3276, January 2018, doi: 10.1126/scirobotics.aar3276.

[17] N. Kellaris, V. G. Venkata, P. Rothemund, and C. Keplinger, "An analytical model for the design of Peano-HASEL actuators with drastically improved performance," Extreme Mech. Lett., vol. 29, p. 100449, May 2019, doi: 10.1016/j.eml.2019.100449.

[18] Arkema, "Piezotech®—Powders—Arkema," 2019. https://www.piezotech.eu/en/Products/Powders/(accessed Sep. 3, 2019).

[19] S. K. Mitchell et al., "An Easy-to-Implement Toolkit to Create Versatile and High-Performance HASEL Actuators for Untethered Soft Robots," Adv. Sci., p. 1900178, June 2019, doi: 10.1002/advs.201900178.

[20] A. Poulin, L. Maffli, S. Rosset, and H. Shea, "Interfacing dielectric elastomer actuators with liquids," in Electroactive Polymer Actuators and Devices (EAPAD) 2015, April 2015, vol. 9430, p. 943011, doi: 10.1117/12.2083837.

[21] L. Tang and N. Y. Lee, "A facile route for irreversible bonding of plastic-PDMS hybrid microdevices at room temperature," Lab on a Chip, vol. 10, no. 10, p. 1274, 2010, doi: 10.1039/b924753j.

[22] K. Aran, L. A. Sasso, N. Kamdar, and J. D. Zahn, "Irreversible, direct bonding of nanoporous polymer membranes to PDMS or glass microdevices," Lab Chip, vol. 10, no. 5, pp. 548-552, March 2010, doi: 10.1039/b924816a.

[23] V. Sunkara, D.-K. Park, and Y.-K. Cho, "Versatile method for bonding hard and soft materials," RSC Advances, vol. 2, no. 24, p. 9066, 2012, doi: 10.1039/c2ra20880f.

[24] H. H. King, R. Donlin, and B. Hannaford, "Perceptual thresholds for single vs. Multi-Finger Haptic interaction," in 2010 IEEE Haptics Symposium, Waltham, Mass., USA, March 2010, pp. 95-99, doi: 10.1109/HAPTIC.2010.5444670.

[25] "(3-Aminopropyl)trimethoxysilane 97%|Sigma-Aldrich." https://www.sigmaaldrich.com/catalog/product/aldrich/281778?lang=fr&region=FR (accessed Sep. 3, 2019).

[26] I. M. Koo, K. Jung, J. C. Koo, J. D. Nam, Y. K. Lee, and H. R. Choi, "Development of Soft-Actuator-Based Wearable Tactile Display," IEEE Transactions on Robotics, vol. 24, no. 3, pp. 549-558, June 2008, doi: 10.1109/TRO.2008.921561.

[27] S. Vishniakou et al., "Tactile Feedback Display with Spatial and Temporal Resolutions," Scientific Reports, vol. 3, no. 1, December 2013, doi: 10.1038/srep02521.

[28] H. Boys, G. Frediani, M. Ghilardi, S. Poslad, J. C. Busfield, and F. Carpi, "Soft wearable non-vibratory tactile displays," in 2018 IEEE International Conference on Soft Robotics (RoboSoft), April 2018, pp. 270-275, doi: 10.1109/ROBOSOFT.2018.8404931.

The invention claimed is:

1. A dielectric actuator comprising:
an enclosure forming a cavity having a dielectric fluid therein, the enclosure having a base, a flexible membrane and a reversibly-stretchable membrane; and
four pairs of electrodes, one electrode of each pairs of electrodes arranged at the flexible membrane, the other electrode of each pairs of electrodes arranged at the base,
the four pairs of electrodes arranged to generate an electric field to four different compression zones in the cavity that is filled with the dielectric fluid, the four pairs of electrodes arranged such that pairs of two compression zones are arranged to face each other in the cavity when viewed from a direction that is perpendicular to a plane formed by the base,
wherein when the electric field is generated between a pair of electrodes of the four pairs of electrodes, an electrostatic pressure in the dielectric fluid causes the flexible membrane to move towards the base, reducing an initial volume of the respective compression zone of the cavity, increases a pressure of the dielectric fluid inside the cavity, and causes the reversibly-stretchable membrane to bump out to an expanded state.

2. The dielectric actuator according to claim 1, wherein upon releasing the electric field from the pair of electrodes of the four pairs of electrodes, the flexible membrane reverses back to an initial position to restore the initial volume of the compression zone, and the reversibly-stretchable membrane reverts back to an initial state.

3. The dielectric actuator according to claim 2, wherein an overall volume of the cavity remains substantially the same between the initial state and the expanded state.

4. The dielectric actuator according to claim 1, wherein the four different compression zones are arranged at four different locations at the side of the cavity, the four different locations surrounding a central area of the cavity that is covered by the reversibly-stretchable membrane.

5. The dielectric actuator according to claim 4, wherein the four different locations for the four pairs of electrodes are arranged to be equally spaced apart from each other.

6. The dielectric actuator according to claim 1, further comprising:
a sealing ring forming a central opening, the sealing ring arranged between the base and the flexible membrane, wherein the central opening has a circular shape, a square shape, a polygon shape, or an oval shape.

7. The dielectric actuator according to claim 1, further comprising:
a second flexible layer having a central opening, the second flexible layer arranged between the one electrode and the reversibly-stretchable membrane.

8. The dielectric actuator according to claim 1, wherein in an initial position, a portion of the reversibly-stretchable membrane that bumps out forms a dome-shape.

9. The dielectric actuator according to claim 1, wherein each one of the four compression zones are arranged at a corner of the cavity, the cavity having a square shape when viewed from the direction that is perpendicular to the plane formed by the base.

10. The dielectric actuator according to claim 1, wherein the four pairs of electrodes are arranged such that
a generation of an electric field between a first pair of electrodes of the four pairs of electrodes without a generation of an electric field between a second pair of electrodes that face the first pair of electrodes causes the reversibly-stretchable membrane to bump out and move laterally towards the second pair of electrodes in a first direction, and
a generation of an electric field between a third pair of electrodes of the four pairs of electrodes without a generation of an electric field between a fourth pair of electrodes that face the third pair of electrodes causes the reversibly-stretchable membrane to bump out and move laterally towards the fourth pair of electrodes in a second direction.

11. The dielectric actuator according to claim 10, wherein the four pairs of electrodes are arranged such that the first direction is perpendicular to the second direction.

12. A matrix of a plurality of dielectric actuators comprising the dielectric actuator as defined in claim 1.

13. The matrix of the plurality of dielectric actuators of claim 12, wherein the plurality of dielectric actuators are mounted to a flexible printed circuit board.

* * * * *